B. S. MOORE.
SHAFT BEARING.
APPLICATION FILED FEB. 19, 1917.

1,332,056.

Patented Feb. 24, 1920.
2 SHEETS—SHEET 2.

WITNESSES:
Fred. A. Lind.
O. W. Kennedy

INVENTOR
Benjamin S. Moore
BY
Wesley G. Carr
ATTORNEY

UNITED STATES PATENT OFFICE.

BENJAMIN S. MOORE, OF WILKINSBURG, PENNSYLVANIA, ASSIGNOR TO WESTINGHOUSE ELECTRIC AND MANUFACTURING COMPANY, A CORPORATION OF PENNSYLVANIA.

SHAFT-BEARING.

1,332,056.  Specification of Letters Patent.  Patented Feb. 24, 1920.

Application filed February 19, 1917. Serial No. 149,483.

*To all whom it may concern:*

Be it known that I, BENJAMIN S. MOORE, a citizen of the United States, and a resident of Wilkinsburg, in the county of Allegheny and State of Pennsylvania, have invented a new and useful Improvement in Shaft-Bearings, of which the following is a specification.

My invention relates to shaft bearings, particularly of the type that are used in connection with dynamo-electric machines, and it has for its object to provide a bearing housing of novel form that may be readily applied to the frame of a dynamo-electric machine.

Shaft bearings of the above-described type, as heretofore constructed, have usually comprised divided housings the members of which are secured together by through-bolts or other suitable clamping means. When it is desired to remove one of the housing members in order to inspect the bearing, difficulty is often encountered in removing the through-bolts because of the small clearances existing between the bearing housing and adjacent portions of the dynamo-electric machine. According to the present invention, I provide a novel form of bearing housing in which one of the housing members is adapted to be removed from the other housing member in a direction parallel to the longitudinal axis of the shaft, the clamping means being so related to the relatively stationary housing member that it is not necessary to remove all of them.

Figure 1:
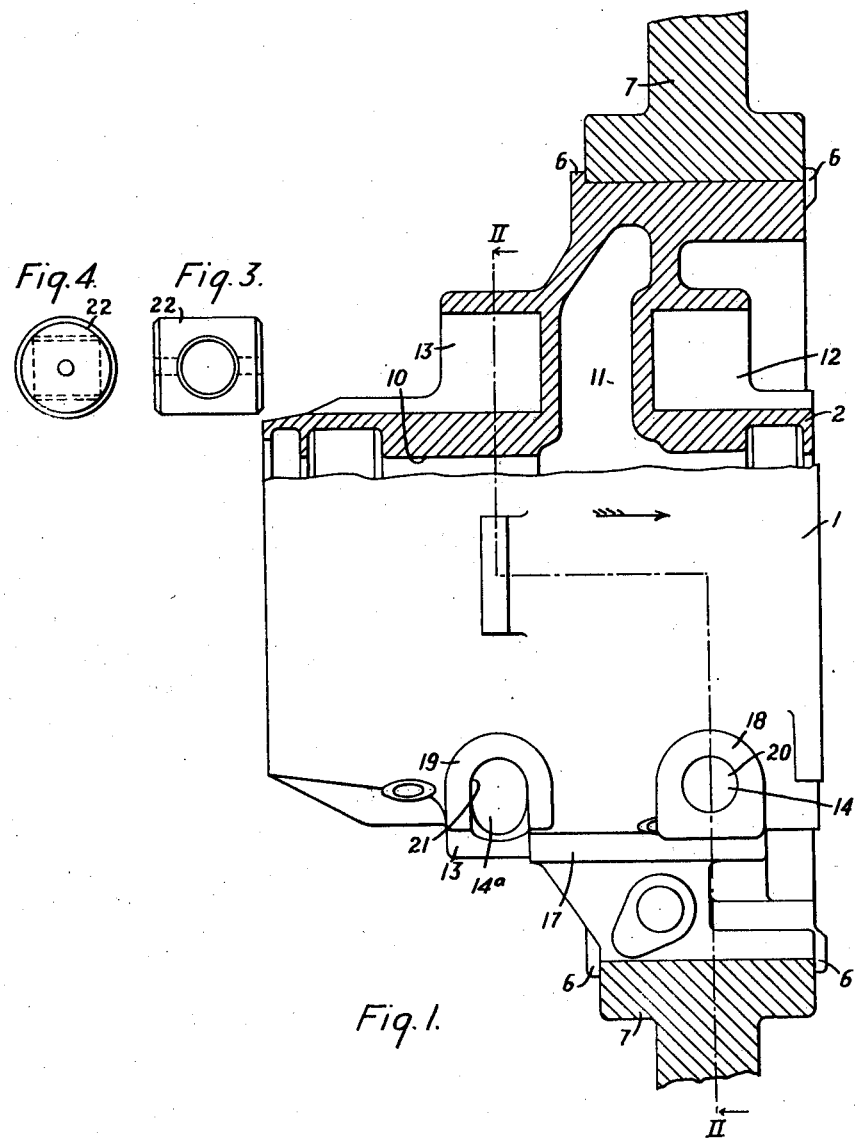
Figure 2:
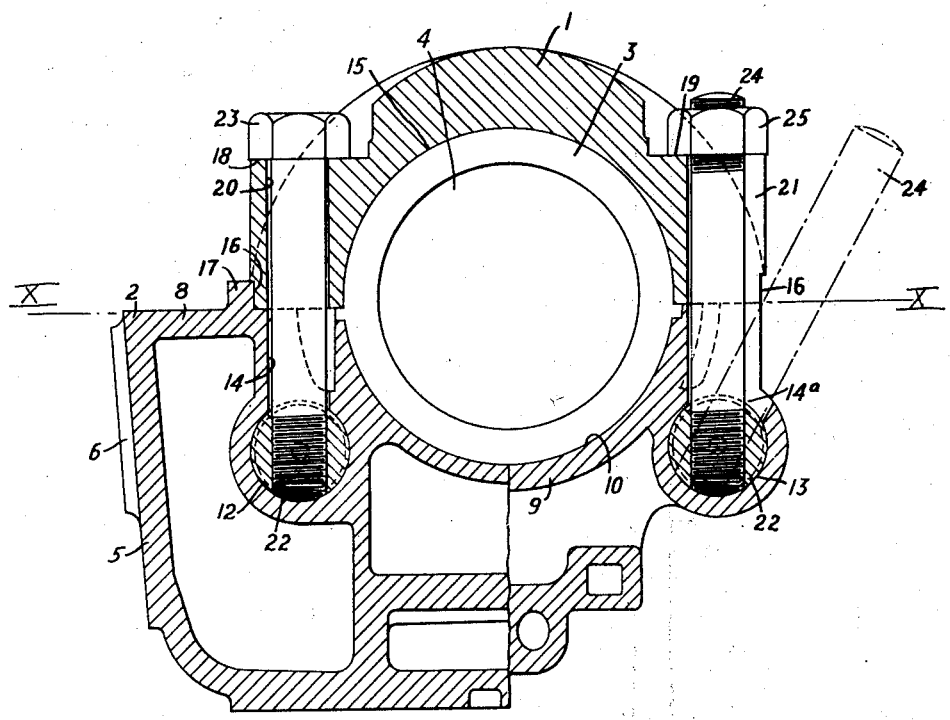

In the accompanying drawings, Figure 1 is a view, partially in plan and partially in section, of a bearing housing embodying my invention; Fig. 2 is a sectional view along the line II—II of Fig. 1, and Figs. 3 and 4 are detail views of a special nut used in connection with my bearing housing.

The housing comprises upper and lower members 1 and 2, respectively, within which is located a bearing 3 for supporting a shaft 4. The lower housing member 2 is of substantially cup-shape in transverse cross-section, the side walls 5 thereof being respectively provided with pairs of end flanges 6—6 between which are located supporting portions of the frame 7 of a dynamo-electric machine. The walls 5 are further provided with overhanging portions 8 between which extends a substantially semi-annular portion 9 the inner surface of which is machined to form a semi-cylindrical seat 10 for the bearing 3. As best shown in Fig. 1, the semi-annular portion 9 is hollow, thereby providing an oil reservoir 11 intermediate the ends of the bearing seat 10. Pairs of substantially cylindrical pockets 12—12 and 13—13 are provided on the respective sides of the reservoir 11, the pockets 12 opening toward the front end of the bearing and the pockets 13 opening toward the machine-end of the bearing, for a purpose that will be hereinafter described. The pockets communicate with the upper face of the housing member 2 by circular passages 14, the passages to the pockets 13 being partially cut away, as shown at 14ª.

The upper member 1 of the housing is generally semi-annular in form and is provided with an inner bearing seat 15 and with straight parallel edges 16 that are located between, and in engagement with, projecting parallel flanges 17 provided on the lower member 2. The engaging longitudinal faces of the housing members 1 and 2 lie in a horizontal plane X—X extending through the axis of the shaft 3. The housing member 1 is further provided with pairs of upwardly extending projections 18—18 and 19—19, respectively, the projections 18 being provided with central openings 20 that register with the corresponding passages 14 leading to the pockets 12, and the projections 19 being provided with slots 21 the inner curved portions of which register with the passages 14 leading to the pockets 13. Nuts 22, that are generally cylindrical in form, as best shown in Figs. 3 and 4, are located in each of the pockets 12 and 13. The nuts 22, that are located in the pockets 12, receive the threaded end-portions of through-bolts 23 which extend through the openings 14 and 20. The nuts 22, that are located in the pockets 13, receive the threaded end-portions of studs 24 which extend through the slots 21 and openings 14. The upper housing member 1 is secured to the lower housing member 2 by the heads of the bolts 23 coacting with the projections 18 and by nuts 25 coacting with the upper threaded end-portions of the studs 24 and with the projections 19.

From the foregoing, it is apparent that, if it be desired to remove the upper housing member 1 in order to inspect the bearing 3, it is only necessary to unscrew the bolts 23 from the corresponding nuts 22 and to remove the nuts 25 from the studs 24. The bolts 23 are then withdrawn from the openings 14 and 18, and the studs 24 are swung outwardly about the cylindrical nuts 22 through the slots 21 and the cut-away portions 14ᵃ of the passages 14 until they clear the edges 16 of the housing member 1, as indicated by dotted lines in Fig. 2. The housing member 1, together with the portion of the bearing 3 located therein, may then be withdrawn longitudinally with respect to the lower member 2, in the direction of the arrow, after raising it slightly in order to clear any projections that may be provided on the shaft 4.

The bearing 3 and the remaining portions of the housing members have not been more completely described, as they form no part of the present invention but are fully shown and described in a copending application, Serial No. 149,480, filed of even date by R. E. Hellmund and B. S. Moore and assigned to the Westinghouse Electric & Mfg. Co.

While I have shown my invention in a simple and preferred form it is susceptible of various modifications within the scope of the appended claims.

I claim as my invention:

1. In combination, a bolt, a cylindrical nut therefor and a cylindrical seat for said nut, said nut being movable within said seat.

2. In combination, a bolt, a cylindrical nut and a seat therefor, said nut being provided with a threaded opening through the cylindrical surface thereof.

3. In a shaft bearing, the combination with upper and lower housing members, of bolts for securing said members together, said bolts being provided with cylindrical nuts disposed within cylindrical seats in one of said housing members, and said bolts extending through a slot in the other of said members.

4. In a shaft bearing, the combination with upper and lower housing members, of bolts for securing said members together, said bolts being provided with cylindrical portions disposed within seats of similar contour in one of said members, the longitudinal axes of said bolts and of said cylindrical portions extending at right-angles to each other, said bolts and said cylindrical portions being adapted to pivot about the longitudinal axis of said cylindrical portions, and normally extending through a slot in the other of said housing members.

5. In a shaft bearing, the combination with upper and lower housing members, of bolts for securing said members together, said bolts being provided with cylindrical nuts disposed within seats of similar contour in said lower member, the longitudinal axes of said bolts and of said nuts extending at right-angles to each other, said bolts and said nuts being adapted to pivot about the longitudinal axes of said nuts, and normally extending through a slot in the upper bearing housing member.

In testimony whereof, I have hereunto subscribed my name this 31st day of January, 1917.

BENJAMIN S. MOORE.